Nov. 29, 1955

D. G. KRAUSS 2,725,194

FUEL MILEAGE CALCULATOR

Filed Sept. 15, 1953

INVENTOR
DAVID G. KRAUSS

BY *Fisher & Christen*

ATTORNEY

Nov. 29, 1955  D. G. KRAUSS  2,725,194
FUEL MILEAGE CALCULATOR
Filed Sept. 15, 1953  3 Sheets-Sheet 2

INVENTOR
DAVID G. KRAUSS

Fisher + Christen

ATTORNEY

Nov. 29, 1955  D. G. KRAUSS  2,725,194
FUEL MILEAGE CALCULATOR
Filed Sept. 15, 1953  3 Sheets-Sheet 3

INVENTOR
DAVID G. KRAUSS

BY Fisher & Christen

ATTORNEY

United States Patent Office 2,725,194
Patented Nov. 29, 1955

2,725,194

FUEL MILEAGE CALCULATOR

David G. Krauss, Amana, Iowa

Application September 15, 1953, Serial No. 380,270

5 Claims. (Cl. 235—84)

This invention relates to improvement in fuel mileage calculators and more particularly to a calculator for computing the distance traveled per unit of fuel consumed.

Motorists frequently have the need to check the rate of fuel consumption of their vehicles in order to ascertain whether they are obtaining economical performance. There is also a desire on the part of many vehicle drivers to compare the difference in the rate of fuel consumption when driving a car in heavy traffic with the rate of fuel consumption of the vehicle on open highways. It is also often necessary and prudent to check a motor vehicle periodically to determine if the vehicle retains its economical running standards. Another need to check the rate of fuel consumption arises when the motorist is testing different commercial types and grades of gasoline to see which is best suited to his particular vehicle.

The average motorist is best able to compare rates of fuel consumption when they are expressed as distance traveled over a unit of fuel consumed.

Accordingly, it is an object of my invention to provide a calculator which may be inexpensively manufactured and easily operated, making it possible for the average motorist to determine quickly the amount of distance traveled per unit of fuel consumed.

A further object of my invention is to provide a fuel mileage calculator of the circular slide rule type which will be more easily manipulated than those designed previously. Another object of my invention is to enable the operator to make a quick setting of the moving parts of the device without having to align the scales by sight in the starting position.

To accomplish these and other objects of my invention, I have invented a calculator for computing a distance traveled per unit of fuel consumed, comprising a base member having circular, concentric logarithmic scales represented thereon, a circular disk member pivotally attached at its center for rotation within said scales, indicating means associated with said disk and an arm element pivotally attached at the center of said disk member and extending to the periphery of the outer scales on said base member, said arm element adapted to have a longitudinal edge aligned relative to said logarithmic scales.

I further accomplish these and other objects by providing a one-way stop means rigidly fixed to the base member of said calculator and adjacent the periphery of said disk member, said disk member being provided with a projecting element extending outwardly from the periphery thereof, whereby said disk member is freely rotatable in one direction only.

Other objects and advantages of my invention will be apparent during the course of the following description and from the accompanying drawings, in which.

Figure 1:
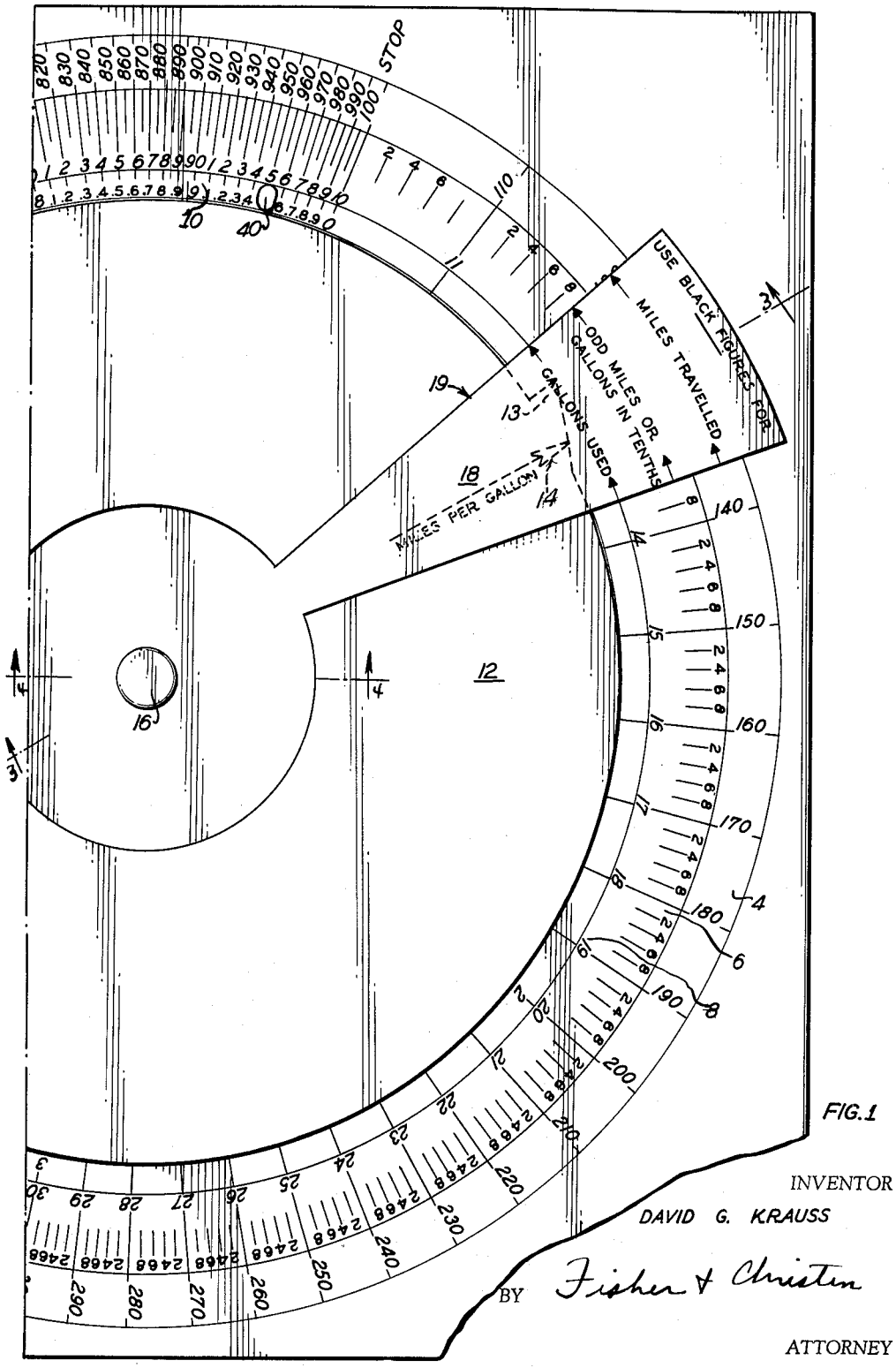
Fig. 1 is a plan view of a portion of a calculator constructed in accordance with this invention.
Figure 1A:
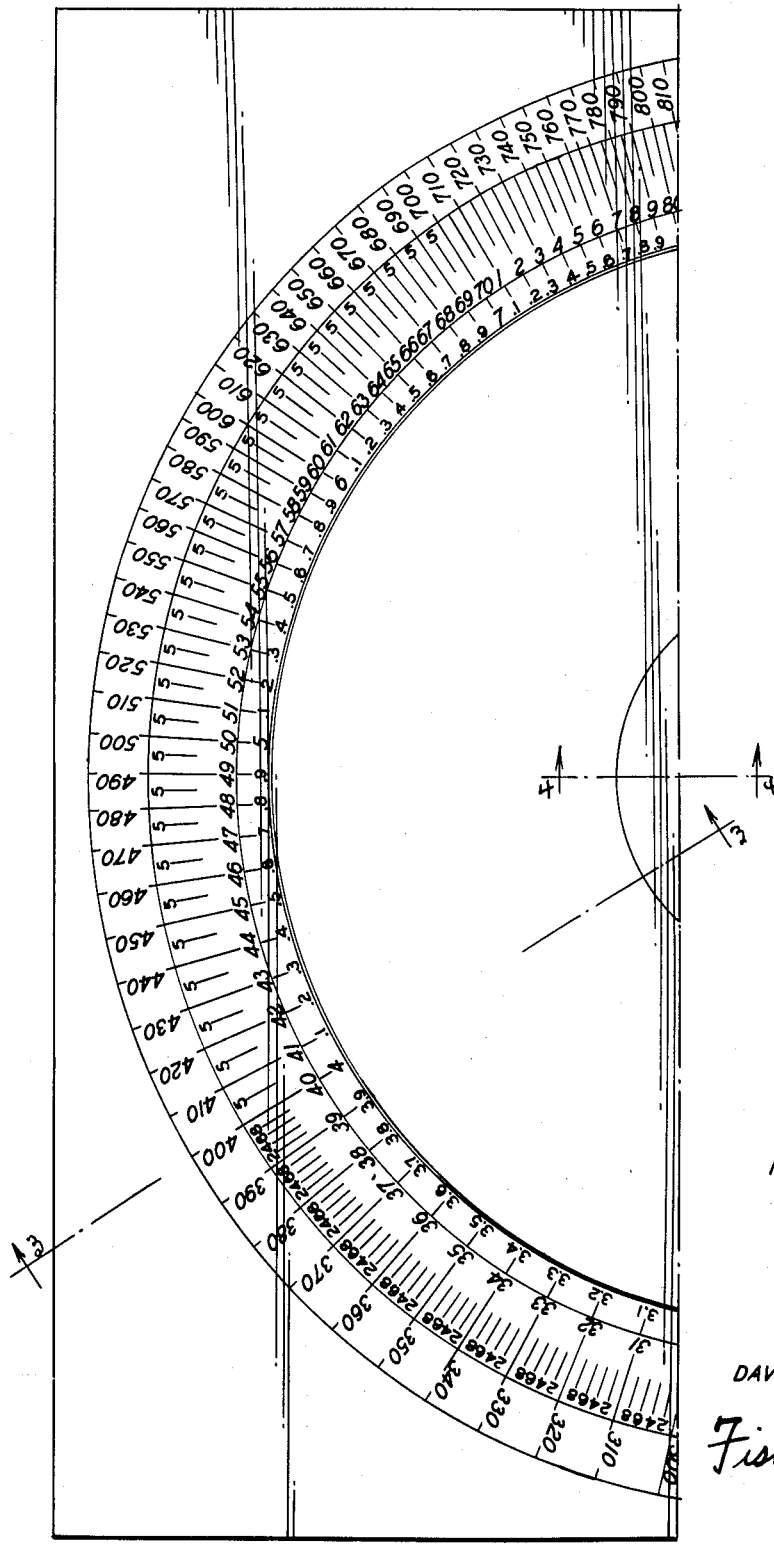
Fig. 1A is a plan view of the remaining portion of the calculator illustrated in Fig. 1.

Referring to Fig. 1 of the drawing, the calculator consists of base member 2 on which is delineated or represented, in any suitable manner, circular, concentric, logarithmic scales 4, 6, 8 and 10.

Scale 4 is arranged logarithmically and represents linearly and numerically the distance traveled in units. The units shown in the drawings are miles. However, any standard linear unit may be used.

Scale 6 is calibrated in tenths and can be used either in connection with scale 4 or scale 8, as will be explained more fully later.

Scale 8 is also arranged logarithmically and represents the amount of fuel consumed and also serves to represent the distance traveled per unit of fuel consumed. The units of fuel are shown in the drawings to be gallons. However, any standard volumetric unit may be used.

Scale 10 also represents the amount of fuel consumed, but the units are one-tenth of those units used in scale 8. This feature is well known in the slide rule art.

Figure 4:
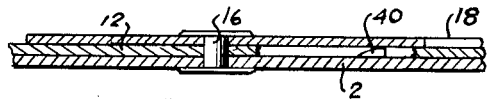
Fig. 4 is a fragmentary cross-sectional view taken along line 4—4 of Fig. 1 with a portion of one member broken away to illustrate the construction of the stop.

Circular disk member 12 is pivotally connected at its center to base member 2 by a rivet 16 for rotation within the circular scales 4, 6, 8 and 10. A projecting element is shown at 13 extending outwardly from the periphery of disk 12. Projecting element 13 engages the upright portion of a one-way stop element 40 which is rigidly fixed to the base member 2 when disk 12 is rotated counterclockwise. The action is similar to that of a ratchet in that the stop element 40 will allow the protruding element 13 to pass over it if the disk 12 is rotated in a clockwise direction, but will stop the disk 12 at a predetermined point if rotated in the opposite direction. The structure of stop element 40 may be seen more clearly at Fig. 4 of the drawing. This feature of having the stop element 40 incorporated in the calculator is for the purpose of aiding the user in setting the device at the starting position quickly and easily without having to concern himself with alignment of the scales.

The disk 12 has indicating means associated therewith in the form of an arrow 14 which, in the form of the invention shown, extends out on the projecting element 30. The arrow 14 is used to indicate distance per unit of fuel, and indicia to that effect may be conveniently placed thereon, as seen in the drawing as miles per hour, along arrow 14.

An arm element 18 is pivotally attached by a rivet at 16 and extends outwardly to and preferably over the outer edge of scale 4. The arm element 18 is constructed in such a manner that its longitudinal edge 19, which is used to associate with the scales of the device, is in alignment with the lines on the scale. In the preferred embodiment of the device, the lines of the scale are drawn radially with reference to the circle made by the scales. Consequently, the arm element 18 will have its working edge 19 constructed so that it extends radially from its pivot point 16. Indicia are applied to the outer end of bar element 18 corresponding to each scale on the device. In addition, each main scale may be of a different color and the indicia on the bar element 18 colored correspondingly.

Figure 2:
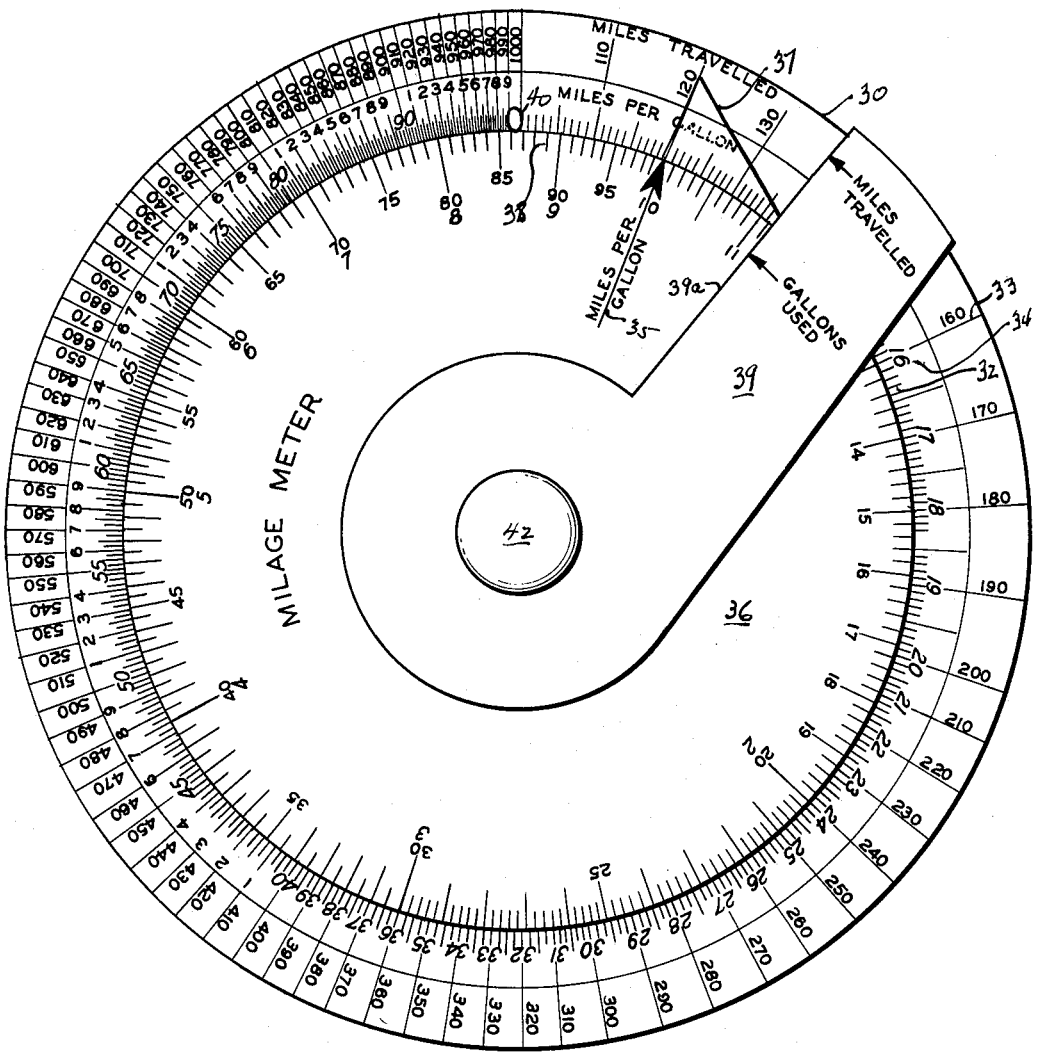
Fig. 2 is a plan view of a modified calculator constructed in accordance with this invention.
Figure 3:
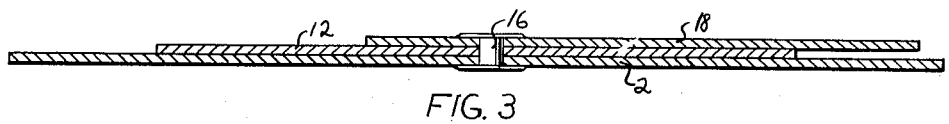
Fig. 3 is a cross-sectional view taken along line 3—3 of Fig. 1.

In Fig. 2, there is shown a modified form of the invention. A circular, logarithmic scale, broadly designated at 32, is positioned on base member 30. The outer numerals 33 represent the distance traveled. The inner numeral 34 on scale 32 represents the distance traveled per unit of fuel consumed.

One-way stop member 40 is rigidly positioned on base member 30 adjacent the periphery of disk member 36. A protruding or projecting element 37 extends from the periphery of disk 36. This projecting element 37 engages stop element 40 in a manner similar to the corresponding elements of the other embodiment of the invention as explained previously. Indicating means are shown on disk 36 at arrow 35. Logarithmic scale 38 is positioned on the edge of disk 36 and represents the amount of fuel consumed.

Pivotally mounted at 42 is an arm element 39 constructed in such a manner that its working longitudinal edge 39a is in radial alignment with the lines of the scales. Indicia are placed on the arm element 39 to indicate what the corresponding scale represents.

The following is given as an example of the operation of the calculator shown in Fig. 1.

The vehicle operator finds from the gauges on his dashboard that he has traveled 180 miles and used 12 gallons of gasoline. In order to find the number of miles traveled per gallon of gasoline, he moves the disk member 12 counterclockwise until the projecting element 13 contacts the stop member 40. At this point, arrow 14 will be aligned with the numeral 10 on scale 8. Disk 12 is held in position and arm member 18 is moved clockwise until its working edge 19 is aligned with the line on scale 8, representing the number of gallons of gas used, which in this case is 12 gallons. Allowing arm member 18 to move with it by frictional contact, disk member 12 is moved clockwise until the working edge 19 of arm 18 is aligned with the line representing the amount of miles traveled on scale 4, which, in this case, is 180 miles. The scale 8 is now read at arrow 14 to determine the miles per gallon, which, in this case, would be 15.

Scale 10 on the device is used for convenience when the amount of fuel used is under 10 gallons.

If the miles traveled were found to be between units as expressed in tens along scale 4, scale 6 may be utilized for units expressed in tenths. For instance, if the miles traveled were 122, the indicator would be moved to 120 on scale 4 and then moved to 2 on scale 6. In a like manner, scale 6 can be used in connection with scale 8. If the number of gallons used happened to be 12.4, the indicator would be moved to 12 on scale 8 and then to 4 on scale 6.

It will be seen from the above example of the operation of the device that the rivet, or rivet member at 16, should be snug enough to make arm 18 follow the disk member 12 without losing its relative position and yet allow for independent rotation of the two elements. Means may be provided between the contacting surfaces of arm 18 and disk 12 to allow for greater frictional engagement, such as a felt washer or the like.

The operation of the modification of the invention shown in Fig. 2 is similar to that of Fig. 1. For example, the operator finds he has traveled 180 miles and used 14 gallons of gasoline. The operator sets the projecting element 37 of disk 36 against one-way stop element 40 by rotating the disc 36 counterclockwise. While disk 36 is held in this position, arm member 39 is moved clockwise until its working edge 39a is aligned with the line on scale 38 on disk 36, which represents 14 gallons. Disk 36, with arm 39 held in its relative position by friction, is then moved until the working edge 39a of arm 39 is aligned with the line on scale 33, which represents 180 miles. From scale 32 at arrow 35 on disk 36 is read the miles per gallon which will be 12.8.

While I have illustrated and described my invention in specific forms, it is to be understood that many modifications of the device may be made without departing from the spirit and scope of the invention as defined by the following claims.

I claim:

1. A calculator for computing distance traveled per unit of fuel consumed, comprising a base member having concentric, logarithmic scales represented thereon, a circular disk member pivotally attached for rotation within said scales, a projecting element extending outwardly from the periphery of said circular disk, indicating means associated with said disk, an arm element pivotally attached at the center of said disk member and movable therewith, said arm element extending to the periphery of the outer scale on the base member and having a longitudinal edge substantially in alignment with said scales on said calculator, and one-way stop means rigidly fixed to said base member and adjacent to the periphery of said disk member.

2. A calculator for computing distance traveled per unit of fuel consumed comprising a base member having circular, concentric, logarithmic scales represented thereon, said scales consisting of an outer scale representing the distance traveled in units and an adjacent inner concentric scale representing the amount of fuel consumed in units, a circular disk member pivotally attached at its center for rotation within said scale, a projecting element extending outwardly from the periphery of said circular disk, indicating means associated with said disk member whereby said indicating means will indicate the distance traveled per unit of fuel consumed, an arm element pivotally attached at the center of said disk member and extending to the periphery of said outer scale, said arm element having a longitudinal edge substantially in alignment with the scales on said calculator, and one-way stop means rigidly fixed to said base member and adjacent the periphery of said disk member, whereby free rotation of said disk will be permitted in only one direction.

3. A calculator for computing the distance traveled per unit of fuel consumed, comprising a base member having circular, concentric scales represented thereon, said scales consisting of an outer scale representing the distance traveled in units and an adjacent inner scale representing the distance traveled per unit of fuel, a circular disk member pivotally attached at its center for rotation within said scales, said disk member having a scale representing the amount of fuel consumed positioned at the outer edge thereof, a projecting element extending outwardly from the periphery of said circular disk, indicating means associated with said disk member whereby said indicating means will indicate the distance traveled per unit of fuel, an arm element pivotally attached at the center of said disk member and extending to the periphery of the outer scale on said base member, said arm element having a longitudinal edge substantially in alignment with the scales on said calculator, and one-way stop means rigidly fixed to said base member and adjacent the periphery of said disk member whereby said disk member will be allowed free rotation in one direction only.

4. A calculator for computing distance traveled per unit of fuel consumed, comprising a base member having concentric, logarithmic scales represented thereon, a circular disk member pivotally attached for rotation within said scales, a projecting element extending outwardly from the periphery of said circular disk, indicating means associated with said disk, an arm element pivotally attached at the center of said disk member and movable therewith, said arm element extending to the periphery of the outer scale on the base member for indicating the miles traveled and the amount of fuel consumed, and one-way stop means rigidly fixed to said base member and adjacent to the periphery of said disk member.

5. A calculator for computing distance traveled per unit of fuel consumed comprising a base member having circular, concentric, logarithmic scales represented thereon, said scales consisting of an outer scale representing the distance traveled in units and an adjacent inner concentric scale representing the amount of fuel consumed in units, a circular disk member pivotally attached at its center for rotation within said scale, a projecting element extending outwardly from the periphery of said circular disk, indicating means associated with said disk member whereby said indicating means will indicate the distance traveled per unit of fuel consumed, an arm element pivotally attached at the center of said disk member and extending to the periphery of said outer scale for indicating the miles traveled and the amount of fuel consumed, and one-way stop means rigidly fixed to said base member and adjacent the periphery of said disk member, whereby free rotation of said disk will be permitted in only one direction.

References Cited in the file of this patent

UNITED STATES PATENTS

| | | |
|---|---|---|
| 736,481 | Betts | Aug. 18, 1903 |
| 843,944 | Hibbard | Feb. 12, 1907 |
| 980,867 | Fenn | Jan. 3, 1911 |
| 1,397,944 | Dazell | Nov. 22, 1921 |
| 1,806,422 | Shaen | May 19, 1931 |
| 2,415,231 | Bastori | Feb. 4, 1947 |
| 2,489,030 | Herrick | Nov. 22, 1949 |
| 2,569,466 | Fischer | Oct. 2, 1951 |

FOREIGN PATENTS

| | | |
|---|---|---|
| 372,746 | Great Britain | May 3, 1932 |